Jan. 13, 1953         L. G. COWLES              2,625,036
                    STRAIN MEASUREMENT
Filed Aug. 13, 1946                        2 SHEETS—SHEET 1

INVENTOR.
LAURENCE G. COWLES
BY
  Daniel Stryker
              ATTORNEY

Jan. 13, 1953 L. G. COWLES 2,625,036
STRAIN MEASUREMENT
Filed Aug. 13, 1946 2 SHEETS—SHEET 2

INVENTOR.
LAURENCE G. COWLES
BY
Daniel Stryker
ATTORNEY

Patented Jan. 13, 1953

2,625,036

UNITED STATES PATENT OFFICE 2,625,036

STRAIN MEASUREMENT

Laurence G. Cowles, Houston, Tex., assignor to The Texas Company, New York, N. Y., a corporation of Delaware Application August 13, 1946, Serial No. 690,311

3 Claims. (Cl. 73—88.5)

This invention is concerned with strain measurement and provides improved strain measurement apparatus particularly adapted to the measurement of cyclic or transient strain in sucker rods of oil well pumps and similar reciprocating members. However, the apparatus has more general application and is useful for testing other types of installations, especially other oil field equipment including rod lines, derricks, pumping jacks, pipes, valves, etcetera, and for the study of pressure transients in flow lines and pumps.

One way of determining the performance of pumps located at the bottom of oil wells is to determine the strain on the sucker rods connected thereto and projecting above the collar of the well. The exposed surface of the sucker rod is small, and it is continuously reciprocating during operation. Various mechanical devices have been proposed heretofore for testing strain in sucker rods. These however, have not had general application and are highly specialized for the particular job. They are not suitable for measurement of strain in other oil field equipment.

The instrument of the invention has been developed to overcome the limitations of such prior devices and offers a number of advantages including high sensitivity, easy adjustment and extreme ruggedness. It has a broad range of application to a variety of strain measuring pobs, this being in strong contrast with the mechanical strain gauges which have been employed heretofore in sucker rod investigations and the like.

The apparatus of the invention employs a resistance type strain sensitive gauge comprising a conductor, say a fine wire, which is adapted to be fastened to the mechanical object undergoing investigation. The gauge itself may be of various types, for example that described in U. S. Patent No. 2,292,549. Such a gauge comprises a on a flexible backing, for example a piece of sinuously wound wire or the like which is placed thin paper, and cemented thereto.

As disclosed in co-pending application Serial No. 690,164, filed August 13, 1946, by Alexander Wolf, now Patent No. 2,568,940, it is desirable to fasten the strain gauge to the member undergoing test by means of an overlying resilient pad which presses the strain gauge proper to the member through the action of a clamp. It is also desirable to employ an abrasive layer between strain gauge proper and the member to which it is clamped by the resilient pad. This aids in anchoring the strain gauge. Thus it is preferable to attach the strain gauge to the reverse side of a piece of sandpaper.

One of the principal difficulties in employing the resistance type strain gauge in measuring the strain on a moving member, say a sucker rod, arises from the fact that flexure of the leads which connect the strain gauge to the rest of the apparatus induces false readings flexure causes variation in the capacitance of the leads resulting in error in the strain gauge reading which cannot be predicted and which may either increase or decrease the magnitude of the readings. As disclosed in the aforementioned application, this flexure may be avoided by mounting the bridge network of the apparatus on the moving member together with the straing gauge. However, I have discovered that this is not essential, since it is possible to mount the bridge network remote from the gauge and the moving member and to compensate for the effect of the flexing leads. Thus may invention contemplates the combination in apparatus for measuring strain in a moving member which comprises a resistance type strain sensitive gauge adapted to be mounted on the member, a Wagner bridge provided with a centrally disposed potentiometer, flexible leads connecting the respective ends of the gauge to one leg of the bridge, capacitances disposed around the respective leads and connected to the slider of the potentiometer, and means for determining bridge unbalance due to resistance changes in the gauge.

Conveniently the means for determining bridge unbalance comprises a vacuum tube amplifier connected to the bridge, a demodulator (preferably of the balanced copper oxide type) connected to the output of the amplifier, a carrier oscillator energizing both the demodulator and the bridge and current indicating means connected in the demodulator. This type of apparatus insures improved results. It operates by indicating and preferably by making a record of variations in the electrical resistance of the strain gauge fastened to the surface of the moving member being tested. This resistance is a function of strain in the moving member, say a sucker rod.

In using the apparatus of the invention, it is possible to make a record of the wave form of cyclic or transient strain set up in the member, although the apparatus may also be employed to measure static and peak strain. It may be designed to give a linear frequency response up to 100 cycles/second or even higher, and in this form give a more accurate representation of impact strain and of high frequency vibration in the member undergoing test.

The apparatus may be employed as a dynamometer for measuring strain in a moving member, say a reciprocating sucker rod, and so employed makes a photographic strain-displacement-diagram. It may also be employed to make a strain-time chart.

The apparatus of the invention is sufficiently sensitive for all practical purposes and is capable of measuring changes in resistance of the strain gauge between 2 and 2000 parts in a million. This corresponds to loads on steel ranging from 30 to 30,000 lbs./sq. in.

In its preferred form then, the equipment of the invention comprises a resistance type strain gauge, a Wagner type bridge, flexible leads connecting the gauge in the bridge, a potentiometer connected across the center of the bridge, capacitances around the flexible leads and connected to the slider of the potentiometer, a vacuum tube amplifier, a low pass demodulator connected to the output of the amplifier, a recording oscillograph connected to the demodulator, and a source of alternating current for energizing both bridge and demodulator.

Other elements such as an amplifier sensitivity control, a timer oscillator, and a stroke marker may be included if desired. It is also desirable, as disclosed hereinafter, to incorporate strain calibration means in the instrument.

The use of the Wagner bridge and of the cable shield or capacitances connected to the central potentiometer eliminates noise caused through the flexure of the gauge leads, and avoids erratic results.

These and other aspects of the invention will be understood more thoroughly in the light of the following detailed description taken in conjunction with the accompanying drawings in which Fig. 1 is a generalized schematic wiring diagram of one form of the apparatus of the invention;

Figure 1:
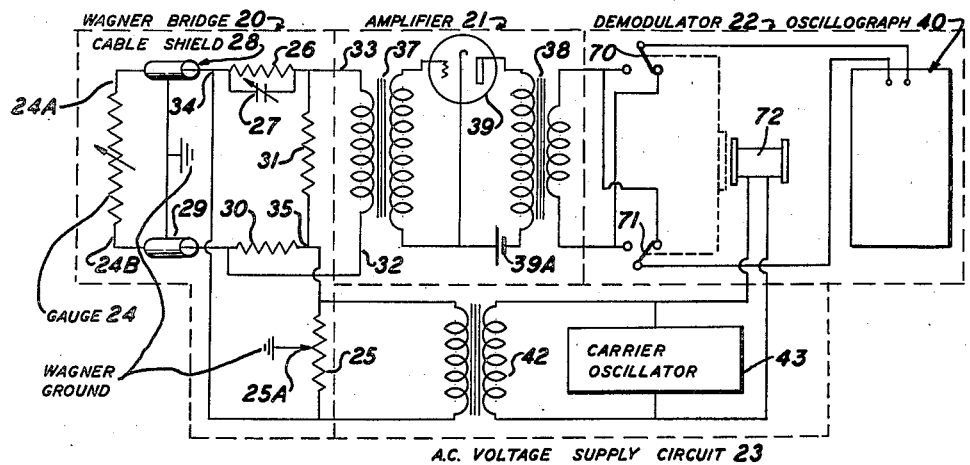

Referring to Fig. 1, the apparatus in its entirety comprises a Wagner bridge 20, an amplifier 21, a demodulator 22 and an A. C. voltage supply circuit 23.

Figure 2:
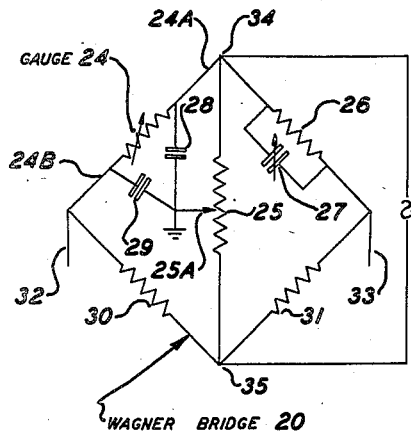
Fig. 2 illustrates the principles upon which the bridge of the apparatus of Fig. 1 operates.

The Wagner Bridge itself may best be understood with reference to Fig. 2 which shows a wire resistance type strain gauge 24 connected in one side of the bridge. This gauge preferably is clamped to the member (say a sucker rod) undergoing test, as disclosed and claimed in the aforementioned co-pending application. A potentiometer 25 is connected across the bridge, and on the side of the bridge adjacent the gauge is a fixed resistor 26 which, if desired, may be shunted by a variable capacitance 27, the latter two serving to balance the variable capacitance effect of the gauge proper and also to effect a phase balance of the bridge. Both sides of the gauge are connected through condensers 28, 29 to ground and through ground (see Fig. 1) to the slider 25A of the central potentiometer which receives its current from a conventional A. C. source 23, as shown with greater particularity in Fig. 1. The two bottom portions of the bridge contain the usual matching resistances 30, 31. The condensers are in reality cable shields (see Fig. 1) disposed respectively around flexible leads 24A, 24B which connect the gauge in the bridge.

It will be apparent that the Wagner bridge just described provides a low potential point to which the cable shields are connected. One of the cable capacitances is, as shown, connected across one-half of the supply source so that it does not affect the bridge balance, while the slider of the potentiometer permits the potential of the low potential point to be adjusted until there is no voltage across the second cable capacitance. With no voltage across this capacitance, the change in the magnitude of the capacitance cannot change the balance of the main bridge circuit. The variable capacitances of the flexible leads and of the strain gauge itself are thus compensated by shifting the slider. In this arrangement, therefore, the strain gauge is the only element which has to be mounted on the member being tested for strain, all other components being mounted more conveniently at a remote point.

The bridge of Fig. 2 is connected by leads 32, 33 to the amplifier, as shown in Fig. 1.

The other main terminals 34, 35 of the bridge circuit at the ends of the central potentiometer receive an alternating current voltage at say 800 cycles/second from a conventional A. C. current source 43 having a frequency higher than those of the waves to be recorded.

The amplifier 21 may be an ordinary audio-frequency A. C. vacuum tube amplifier, equipped with an input transformer 37, one or more amplifying stages (tubes) 39 and an outlet transformer 38. A conventional D. C. potential source 39A for the amplifier is connected in the plate circuit of the tube. When A. C. voltage is applied to the terminals 34, 35 of the bridge, the strain variation noted by the wire strain gauge produces a modulated carrier voltage at the other terminals 32, 33. The output of the bridge across these latter terminals is sent to the amplifier. The output of the amplifier in turn connects through the output transformer 38 to the demodulator 22, shown schematically in Fig. 1, but preferably one of the balanced copper oxide type (see Fig. 3).

It is not necessary to use a copper oxide demodulator, and other types of demodulators or even a rectifier can be employed.

The demodulator 22 shown in Fig. 1 is a phase-sensitive full wave synchronous rectifier of conventional type and supplies pulses to an oscillograph 40 or other suitable indicator or recorder. It comprises a pair of switches 70, 71 controlled by a relay 72 so that both switches are thrown in unison, the relay being energized by a carrier oscillator 43 operating at suitable frequency. This current source also energizes the bridge, as indicated hereinbefore, through another transformer 42.

One side of the oscillograph is connected permanently to the arm of one switch and the other side is permanently connected to the arm of the other switch, the arms being thrown at the same time by the relay. One end of the secondary of the transformer 38 is connected in parallel to a right hand contact of one switch and a left hand contact of the other. The other end of the secondary is similarly connected to the remaining contacts, i. e. to the left hand contact of the first switch and the right hand contact of the other.

The switches move in synchronism with the oscillator frequency and accomplish full wave rectification of the current supplied to the oscillograph. Thus, due to the switching action, the flow of current in either lead at the oscillograph is unidirectional.

Figure 3:
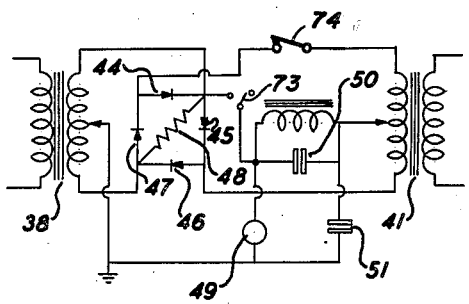
Fig. 3 is a wiring diagram of a copper oxide type of demodulator for use in the apparatus of Fig. 1.

A demodulator circuit specifically including a balanced copper oxide demodulator and suitable for the practice of the invention is shown in Fig. 3. As in the simplified diagram of Fig. 1, the amplifier output is supplied to the demodulator circuit by the output transformer 38, but current of carrier frequency is supplied through another transformer 41 in the circuit.

The demodulator proper comprises four copper oxide uni-directional conductive elements 44, 45, 46, 47 arranged to conduct in the same direction around the periphery of a bridge network across which a resistance 48 is connected. The demodulator, as in the case of the apparatus of Fig. 1, operates as a switch and supplies pulses to an oscillograph string 49, one side of which is connected to the center tap of the transformer 38 (and also to ground). The other side of the oscillograph string is connected through the demodulator alternately to opposite ends of the transformer 38.

The demodulator circuit of Fig. 3 is completed by a filter condenser 51 which is connected in parallel with the oscillograph string to opposite ends of an L-C combination 50, which in turn is connected to the center tap of the transformer 41.

Further details of a suitable copper oxide demodulator for the practice of the invention are given by R. S. Caruthers in the Bell System Technical Journal for April, 1939.

The switching may be effected by applying a carrier frequency signal of about two volts to the copper oxide demodulator in such a way that positive half cycles of the carrier frequency cause one pair 44, 45 of the demodulator units to conduct, and negative half cycles cause the other pair 46, 47 of units to conduct. The amplifier signal, which is maintained at a value which does not affect the conductivity of the demodulator unit, reaches the oscillograph via the center tap of the carrier frequency transformer 41 in the demodulator unit.

The demodulator of Fig. 3 is a conventional phase-sensitive full wave rectifier or demodulator, but it is not sensitive to quadrature current. However, by throwing the switch 73 to the right and opening the switch 74, so that the reference signal from the oscillator is disconnected, the oscillograph string is caused to operate as a simple galvanometer connected to a half wave rectifier. In this condition, residual unbalance voltage of the strain gauge will appear at the indicator of the oscillograph and can be reduced to a minimum or balanced out by adjustment of the strain gauge or the bridge network.

In making strain tests upon reciprocating members such as sucker rods and the like a mechanical switching device (not shown) may be provided so that equal intervals of the sucker rod strokes are indicated by suitable marks on the record. The switching device is, however, not essential, and in many applications (for example, static tests) is superfluous.

Figure 4:
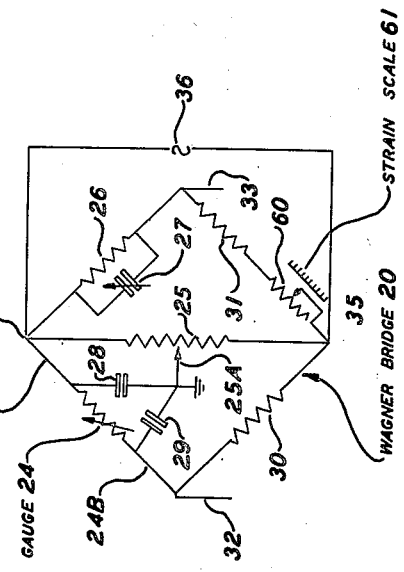
Fig. 4 is a modified bridge network for use in the practice of the invention and including strain calibration means.

Calibration of the apparatus is desirable, and I have developed means whereby this can be accomplished at any time, even during a testing operation. The calibration apparatus is exceedingly simple and comprises a variable resistance inserted in any one of the four legs of the bridge and graduated in terms of mechanical strain instead of electrical resistance. Thus as shown in Fig. 4, an adjustable resistance 60 is placed in series with the fixed resistance 31 on the leg of the bridge opposite the strain gauge. The particular leg is a matter of convenience and the resistance can be placed in any one. The slider of the resistance 60 moves along a scale 61 calibrated in terms of strain, for example in micro-inches/in.

Save for the strain scale and the variable resistance, the bridge of Fig. 4 is like that of Fig. 2, like parts being designated by the same numerals, and it is adapted for connection in the apparatus of Fig. 1 to an oscillograph or other recording element. In operation, a desired amount of resistance can be introduced into the bridge at any time with the result that the recorder is displaced by a distance which indicates directly the sensitivity of the apparatus. If a recorder which produces a record on a moving film is employed, the calibration appears directly on the record. An example of such record is reproduced in Fig. 5.

Figure 5:
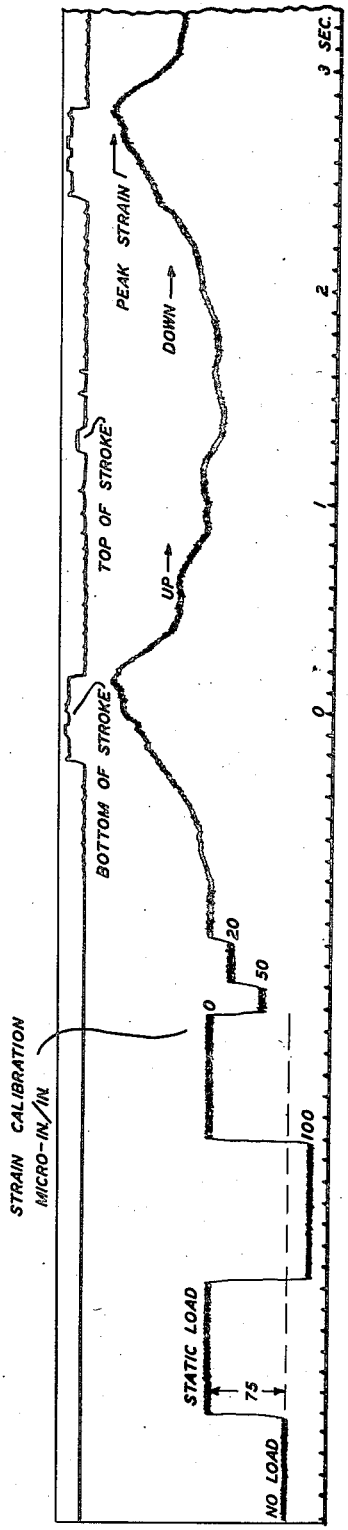
Fig. 5 is a strain-time diagram taken in sucker-rod testing with the instrument of the invention and illustrating the use of the strain calibrator of Fig. 4 as well as the strains developed in the reciprocating rod.

In the sucker rod test recorded in Fig. 5, a collar was clamped below the strain gauge around the sucker rod initially and rested on the supporting structure so that the portion of the sucker rod at the gauge was subjected to no load. Next the clamp was removed so that the entire weight of the sucker rod below the gauge produced a static load which was recorded. Next a resistance corresponding to 100 micro-inches/in. was introduced into the bridge with the resistance 60 resulting in a displacement of the trace on the record corresponding directly to that amount of strain. The resistance was next cut out entirely, so that the static load alone affected the trace. Following this the trace was displaced to obtain additional calibrations corresponding respectively to 50 and 20 micro-inches/inch. Thereafter, the pump was placed in operation and dynamic strain measured through several reciprocating cycles of the sucker rod, the effect of two cycles being shown on the chart, the corresponding stroke positions being indicated on the chart.

In order to eliminate bending effect in measuring sucker rod strain and the like it is desirable to employ a gauge composed of two resistances connected in parallel and clamped respectively by resilient pads on opposite sides of the rod. In this way bending stresses cancel out automatically, to the end that tensile stresses alone are measured.

I claim:

1. In apparatus for measuring strain in a moving member, the combination which comprises a resistance type strain sensitive gauge adapted to be mounted on the member, a Wagner bridge provided with a centrally disposed potentiometer, flexible leads connecting the respective ends of the gauge to one leg of the bridge, capacitances formed respectively by the flexible leads and shields disposed around them, with the shields connected to the slider of the potentiometer, and means for determining bridge unbalance due to resistance changes in the gauge.

2. In apparatus for measuring strain in a moving member, the combination which comprises a resistance type strain sensitive gauge adapted to be mounted on the member, a Wagner bridge provided with a centrally disposed potentiometer, flexible leads connecting the respective end of the gauge to one leg of the bridge, capacitances formed respectively by the flexible leads and shields disposed around them, the shields being connected to the slider of the potentiometer, means for determining bridge unbalance due to resistance changes in the gauge and electrical amplifying means connected between the bridge and the means for determining bridge unbalance.

3. In apparatus for measuring strain in a moving member, the combination which comprises a resistance type strain sensitive gauge adapted to be mounted on the member, a Wagner bridge provided with a centrally disposed potentiometer, flexible leads connecting the respective ends of the gauge to one leg of the bridge, capacitances formed by the respective leads and shields disposed respectively around them, the shields being connected to the slider of the potentiometer, indicating means for determining bridge unbalance due to resistance changes in the gauge, and a variable resistance connected in one leg of the bridge and graduated in terms of strain for calibrating the indicating means.

LAURENCE G. COWLES.

REFERENCES CITED

The following references are of record in the file of this patent:

UNITED STATES PATENTS

| Number | Name | Date |
| --- | --- | --- |
| 1,840,635 | Parker | Jan. 12, 1932 |
| 2,188,628 | Freystedt | Jan. 30, 1940 |
| 2,275,317 | Ryder | Mar. 3, 1942 |
| 2,276,843 | Hathaway | Mar. 17, 1942 |
| 2,393,669 | Wheaton et al. | Jan. 29, 1946 |

OTHER REFERENCES

"Strain Gages" by D. M. Nielson, in "Electronics," December 1943, pages 106–111, 192 and 194.

"Radio Engineering Handbook," second edition, 1935, by Keith Henney. Published by McGraw-Hill Book Co., pages 224, 225 and 226.